US007022206B2

(12) United States Patent
Wang

(10) Patent No.: US 7,022,206 B2
(45) Date of Patent: *Apr. 4, 2006

(54) COOLANT RESISTANT AND THERMALLY STABLE PRIMER COMPOSITION

(75) Inventor: Zhiqiang M. Wang, Carlsbad, CA (US)

(73) Assignee: Lord Corporation, Cary, NC (US)

( * ) Notice: Subject to any disclaimer, the term of this patent is extended or adjusted under 35 U.S.C. 154(b) by 187 days.

This patent is subject to a terminal disclaimer.

(21) Appl. No.: 10/148,053

(22) PCT Filed: May 23, 2001

(86) PCT No.: PCT/US01/16841

§ 371 (c)(1), (2), (4) Date: May 23, 2002

(87) PCT Pub. No.: WO01/90270

PCT Pub. Date: Nov. 29, 2001

(65) Prior Publication Data

US 2003/0207986 A1 Nov. 6, 2003

Related U.S. Application Data

(63) Continuation-in-part of application No. 09/576,461, filed on May 23, 2000, now Pat. No. 6,350,799.

(51) Int. Cl.

| | |
|---|---|
| ***C08J 5/00*** | (2006.01) |
| ***B32B 27/38*** | (2006.01) |
| ***B32B 15/06*** | (2006.01) |
| ***B32B 15/08*** | (2006.01) |
| ***C08L 63/00*** | (2006.01) |

(52) U.S. Cl. ..................... 156/330; 428/416; 525/476; 525/528

(58) Field of Classification Search ................ 525/390, 525/391, 393, 396, 474, 476, 509, 510, 523, 525/528, 534; 523/400; 524/188, 451; 156/325, 156/326, 327, 330; 428/413, 414, 416, 418, 428/421, 422, 521, 522

See application file for complete search history.

(56) References Cited

U.S. PATENT DOCUMENTS

| | | | | |
|---|---|---|---|---|
| 3,022,196 | A | 2/1962 | Jenkins et al. | |
| 3,874,921 | A | 4/1975 | Todd | |
| 4,133,789 | A | 1/1979 | Lakshmanan | |
| 4,182,732 | A | 1/1980 | Fry | |
| 4,308,071 | A | 12/1981 | Gervase | |
| 4,544,688 | A | 10/1985 | Salensky et al. | |
| 4,670,057 | A * | 6/1987 | Oezelli et al. | 106/236 |
| 4,847,319 | A * | 7/1989 | Bandlish | 524/589 |
| 4,914,149 | A | 4/1990 | Fleming et al. | |
| 4,954,553 | A | 9/1990 | Johnson et al. | |
| 5,340,946 | A | 8/1994 | Friedrich et al. | |
| 5,374,677 | A | 12/1994 | Nishio et al. | |
| 5,496,886 | A | 3/1996 | Courlias | |
| 5,532,314 | A | 7/1996 | Sexsmith | |
| 5,559,197 | A | 9/1996 | Ma et al. | |
| 5,623,044 | A | 4/1997 | Chiao | |
| 5,773,113 | A | 6/1998 | Alchter | |
| 5,852,137 | A * | 12/1998 | Hsieh et al. | 525/458 |
| 5,907,015 | A | 5/1999 | Sexsmith | |
| 5,965,269 | A | 10/1999 | Inada et al. | |
| 6,048,579 | A | 4/2000 | Wang et al. | |
| 6,093,455 | A | 7/2000 | Kamen et al. | |
| 6,350,799 | B1 * | 2/2002 | Wang | 524/188 |
| 6,676,740 | B1 * | 1/2004 | Matsumura et al. | 106/287.1 |

* cited by examiner

*Primary Examiner*—Michael J. Feely
(74) *Attorney, Agent, or Firm*—Todd W. Galinski

(57) ABSTRACT

A coolant-resistant and thermally stable primer composition comprising an organic-functional silane, preferably the reaction product of at least one amino-functional silane and at least one isocyanato-functional silane, is provided. The primer composition may additionally comprise a phenoxy resin, a phenolic resin and talc. A method for bonding an elastomer to a metal also is provided.

20 Claims, No Drawings

COOLANT RESISTANT AND THERMALLY STABLE PRIMER COMPOSITION

This application is a 371 of PCT/US01/16841, filed May 23, 2001, which is a continuation-in-part of application Ser. No. 09/576,461, filed May 23, 2000, now U.S. Pat. No. 6,350,799.

FIELD OF THE INVENTION

The invention relates to primer compositions that are useful for bonding elastomers to various substrates, such as metals, ceramics, fiberglass, and organic polymers. The primer compositions of the invention contain organic-functional silane compounds.

BACKGROUND OF THE INVENTION

Since the late 1980's, elastomer coated stainless steel coils have been used to design multi-layered steel engine head gaskets. In particular, these stainless steel coils have been coated with elastomers such as nitrile butadiene rubber or fluoroelastomer. Application of a thin primer between the rubber coating and stainless steel surface is a common industrial practice since an elastomer coating alone does not provide the desired wet adhesion on stainless steels. Generally speaking, the resistance of the primer to the surrounding media, such as engine oil, coolant, fuel and heat, in a great degree, decides the performance and durability of the gasket.

Numerous silane adhesive compositions have previously been developed for the purpose of bonding elastomeric materials to various substrates. For example, U.S. Pat. Nos. 5,532,314 and 5,907,015 relate to silane adhesive compositions which have various organic-functional silanes as a bonding agent. Primers based on silanes generally show good dry adhesion in bonding organic coatings to steel or other metal substrates. However, some of the silane based primers have been found to not have the desired durability in hot coolant immersion.

Phenolic resoles toughed by elastomers or flexible organic resins are widely used as primers or structural adhesives to bond metals. The adhesion between the phenolic resole based primers and the metal surface can be enhanced by addition of organic silanes. In many applications, satisfactory adhesion is achieved using a phenolic/silane based primer. However, the adhesion is gradually lost under aggressive wet environments such as boiling water exposure or hot coolant immersion.

Thus, there is a need in the art for a primer or adhesive composition for bonding elastomers to substrates which exhibits good adhesion in both dry and wet applications. There further is a need in the art for a primer or adhesive composition which shows robust dry and wet adhesion to metallic or other surfaces under harsh environments such as hot oil, hot coolant and thermal aging. Additionally, there is a need in the art for a coolant resistant primer or adhesive for bonding elastomers to substrates which also is thermally stable. Moreover, there is a need in the art for a primer composition which can bond elastomers to substrates without surface treatment of the substrate. This invention provides such a primer and a method for bonding an elastomer to a substrate with the primer of the invention.

SUMMARY OF THE INVENTION

The present invention provides primer compositions which bond elastomers to substrates such as metals, ceramics, fiberglass, or organic polymers. In particular, the invention is directed to a primer composition which includes an organic-functional silane adduct. In one embodiment, the organic-functional silane adduct is prepared by reacting at least one amino-functional silane with at least one isocyanato-functional silane. In another embodiment, the primer composition comprises a phenolic resin, a phenoxy resin, and an organic-functional silane adduct, preferably an organic-functional silane adduct wherein the silane adduct is prepared by reacting at least one amino-functional silane with at least one isocyanato-functional silane. In a preferred embodiment, the primer composition further comprises talc.

The invention further is directed to a method of bonding an elastomer to a metal comprising coating the metal with a primer composition comprising a phenolic resin, a phenoxy resin, and an organic-functional silane adduct, drying the primer composition coating, applying an elastomer coating to the primer composition coating, and curing the elastomer coating with heat.

It has been found that the primer compositions of the present invention containing phenolic resins are unstable in combination with polyisocyanates or isocyanatosilanes. However it would be desirable to provide adhesive primers containing organic-functional silane adducts that provide good dry as well as wet adhesion, particularly of elastomers to substrates such as metals, when these adducts are used in compositions as primers, adhesives or as a protective coating on metals.

DETAILED DESCRIPTION OF THE INVENTION

In one aspect primers according to the present invention comprise a phenolic resin and an adduct which contains essentially no free isocyanate and is either (1) the reaction product of a molar excess of an organic (non-isocyanate)-functional silane and a polyisocyanate or (2) the reaction product of two or more organic functional silane compounds, one being an isocyanatosilane, and the other a non-isocyanate silane which is contains at least one isocyanate-reactive group.

In another aspect there is provided a silane adduct which is characterized as a reaction product of an (a) isocyanatosilane or polyisocyanate and (b) in a molar excess of (B), in relation to (a) of a non-isocyanate silane that is co-reactive with (a). The reaction product is essentially absent any free isocyanate groups.

Representative non-isocyanate-organofunctional silanes which are suitable for making an adduct with an isocyanatosilane or polyisocyanate include without limitation those silanes that contain a group that contains an abstractible hydrogen, such as amino, mercapto, and hydroxy groups.

Representative hydroxyl group-containing silanes have the general structure:

(A)

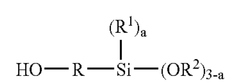

wherein R in all instances herein is a divalent aliphatic, cycloaliphatic or aromatic saturated or unsaturated radical having from 1 to 20 carbon atoms, and is preferably an alkylene radical having from 1 to 9, most preferably 2 to 4, carbon atoms; $R^1$ is a monovalent aliphatic, cycloaliphatic or aromatic radical having from 1 to 20 carbon atoms, and is preferably selected from the group consisting of alkyl radicals having from 1 to 4 carbon atoms, cycloalkyl radicals having from 4 to 7 ring carbon atoms, and aryl radicals having 6, 10, or 14 nuclear carbon atoms, and including such aryl radicals containing one or more substituent alkyl groups having from 1 to 4 carbon atoms; $R^2$ is a monovalent aliphatic, cycloaliphatic or aromatic organic radical containing from 1 to 8 carbon atoms, and is preferably selected from the group consisting of alkyl radicals having from 1 to 4 carbon atoms, $R^3$—O—$R^4$,

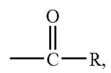

and where $R^3$ is an alkylene group having from 1 to 4 carbon atoms (methyl, ethyl, propyl, butyl) and $R^4$ is an alkyl group having from 1 to 4 carbon atoms; and a is zero or 1, preferably zero;

Aminofunctional silanes include those having the structure (B)

(B)

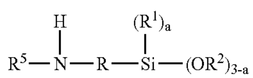

wherein R, $R^1$, $R^2$ and a are as previously defined for (A); and $R^5$ is selected from the group consisting of hydrogen, monovalent aliphatic radicals having from 1 to 8 carbon atoms, monovalent cycloaliphatic radicals having from 4 to 7 ring carbon atoms, phenyl, alkaryl radicals having 6 nuclear carbon atoms and containing one or more substituent alkyl groups having from 1 to 4 carbon atoms, and —$R^6$—NH—$R^7$, wherein $R^6$ is selected from the group consisting of divalent aliphatic, cycloaliphatic and aromatic radicals having from 1 to 20 carbons, there being preferably at least two carbon atoms separating any pair of nitrogen atoms, with $R^6$ being preferably an alkylene group of 2 to 9 carbon atoms; and $R^7$ being the same as $R^5$ and preferably is hydrogen.

Mercaptofunctional silanes include those having the structure (C)

(C)

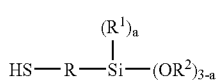

wherein R, $R^1$, $R^2$ and a are as previously defined;

Other preferred organosilane compounds have a single organic chain having from 1 to 20 carbon atoms, said chain having at least one extractable hydrogen atom, said extractable hydrogen atom preferably being attached to a functional group separated from the silicon atom by a chain of at least 3 interconnected carbon atoms.

Representative isocyanate-reactive organosilanes are hydroxypropyltrimethoxysilane, hydroxypropyltriethoxysilane, hydroxybutyltrimethoxysilane, g-aminopropyltrimethoxysilane g-aminopropyltriethoxysilane, methylaminopropyltrimethoxysilane, g-aminopropyltripropoxysilane, g-aminoisobutyltriethoxysilane, g-aminopropylmethyldiethoxysilane, g-aminopropylethyldiethoxysilane, g-aminopropylphenyldiethoxysilane, d-aminobutyltriethoxysilane, d-aminobutylmethyldiethoxysilane, d-aminobutylethyldiethoxysilane, g-aminoisobutylmethyldiethoxysilane, N-methyl-g-aminopropyltriethoxysilane, N-phenyl-g-aminoisobutylmethyldiethoxysilane, N-ethyl-d-aminobutyltriethoxysilane, N-g-aminopropyl-g-aminopropyltriethoxysilane, N-.beta.-aminoethyl-g-aminoisobutyltriethoxysilane, N-g-aminopropyl-d-aminobutyltriethoxysilane, N-aminohexyl-g-aminoisobutylmethyldiethoxysilane, methylaminopropyltriethoxysilane, g-aminopropylmethoxydiethoxysilane, and the like.

Adducts can be formed by reaction of the above organofunctional silane with polyisocyanates. Polyisocyanates can be any compound bearing at least two reactive isocyanate groups. Included within the purview of suitable polyisocyanates are aliphatic, cycloaliphatic, and aromatic polyisocyanates, as these terms are generally interpreted in the art. Thus it will be appreciated that any of the known polyisocyanates such as alkyl and alkylene polyisocyanates, cycloalkyl and cycloalkylene polyisocyanates, aryl and arylene polyisocyanates, and combinations such as alkylene, cycloalkylene and alkylene arylene polyisocyanates, can be employed in the practice of the present invention. The adduct contains substantially no residual free isocyanate groups, which would cause instability in the adduct in the presence of a phenolic resin and/or phenoxy resin. "Substantially absent free isocyanate groups in the adduct" means that the level of free residual isocyanate groups in the adduct is negligible, or of such a low amount as to not cause an instable mixture with phenolic resin and/or phenoxy compound in the primer.

Suitable polyisocyanates reacted with the organosilanes to make the adduct include without limitation tolylene-2,4-diisocyanate, 2,2,4-trimethylhexamethylene-1,6-diisocyanate; hexamethylene-1,6-diisocyanate, diphenylmethane-4,4'-diisocyanate, triphenylmethane-4,4',4-triisocyanate, 3-isocyanatomethyl-3,5,5-trimethylcyclohexylisocyanate, polymethylene polyphenylisocyanate, m-phenylenediisocyanate, p-phenylenediisocyanate, 2,6-tolylene diisocyanate, 1,5-naphthalenediisocyanate, naphthalene-1,4-diisocyanate, diphenylene-4,4'-diisocyanate, 3,3'-bitolylene-4,4'-diisocyanate, ethylene diisocyanate; propylene-1,2-diisocyanate, butylene-2,3-diisocyanate, ethylidenediisocyanate, butylidenediisocyanate, xylene-1,4-diisocyanate, xylylene-1,3-diisocyanate, methylcyclohexyldiisocyanate, cyclopentylene-1,3-diisocyanate, cyclohexylene-1,4-diisocyanate, 4,4-methylene-bis(cyclohexylisocyanate), p-phenylene-2,2'-bis (ethylisocyanate), 4,4'-diphenylene ether-2,2'-bis (ethylisocyanate), tris(2,2',2-ethylisocyanate benzene), 5-chloro-phenylene-1,3-bis(propyl-3-isocyanate), 5-methoxy-phenylene-1,3-bis(propyl-3-isocyanate), 5-cyanophenylene-1,3-bis(propyl-3-isocyanate), 4-methyl-phenylene-1,3-bis(propyl-3-isocyanate), and the like. Preferred polyisocyanates are polyalkylene (polyaryleneisocyanates) having the formula (C):

(C)

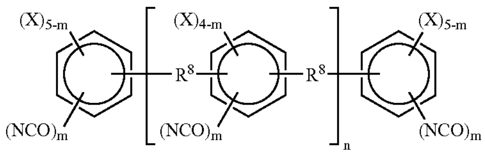

wherein $R^8$ is a divalent organic radical, preferably a divalent aliphatic radical having from 1 to 8 carbon atoms, especially such radicals obtained by removing the carbonyl oxygen from an aldehyde or ketone, and preferably is methylene;

m is 1 or 2, and is preferably 1;

n is a digit having an average value in the range from zero to 15, preferably 0.1 to 4, and most preferably 0.3 to 1.8; and X is independently selected from the group consisting of hydrogen, halogen, alkyl radicals having from 1 to 8 carbon atoms, and alkoxy radicals having from 1 to 8 carbon atoms, and preferably is hydrogen.

Isocyanatosilane adducts can be readily prepared by effecting reaction between a multifunctional organosilane and a polyisocyanate by adding the organosilane, preferably as a dilute solution, to the polyisocyanate, also preferably diluted, at a temperature in the range from about 10° to about 100° C., while agitating the mixture by a mechanical stirrer or similar device. While not essential, a suitable catalyst, such as dibutyltin dilaurate, can be employed. The reaction is essentially instantaneous, particularly when catalysts are employed, and is accompanied by a mold exotherm. It is essential that the amount of polyisocyanate present during the reaction be such as to ensure obtaining an adduct having at least one free isocyanate group. Thus it will be appreciated that the minimum amount, in molar equivalents of NCO, of polyisocyanate required to form the adducts of the invention is one molar equivalent of NCO in excess of the amount, in molar equivalents of NCO, required to react with all the active hydrogen of the silane reactant Preferably, the silane adducts are prepared by reacting at least one primary amino-functional silane with at least one isocyanato-functional silane or polyisocyanate. In the reaction product of a non-isocyanatesilane and a polyisocyanate, the non-isocyanatesilane must be present in a molar excess, in relation to the equivalents of isocyanate groups present in the polyisocyanate. Detection of residual isocyanate can be readily determined so as to provide sufficient removal of the isocyanate. Alternatively, but not as preferred, an equimolar amount of non-isocyanatesilane could be used, leaving residual isocyanate groups remaining in the adduct which can be further converted routinely by hydrolysis, rendering the adduct stable for combination with a phenolic and/or phenoxy resin.

It has unexpectedly been found that the reaction products of these types of organic-functional silanes provide good adhesion in both wet and dry applications and if the adduct is made using a molar excess of organofunctional silane, a stable mixture with phenolic resin can be obtained. The reaction of an amino-functional silane and an isocyanato-functional silane of one embodiment results in a hexaalkoxylsilane bonded through a urethane or substituted urea linkage. The resulting adduct provides excellent properties when used as a primer, even in aggressive wet environments.

Silanes previously have been used as adhesion promoters for organic coatings. However, it is known that the siloxane bond formed after silane crosslinking can be hydrolyzed with water. Consequently, most of the silane based primers have good dry adhesion but poor wet adhesion. The primer composition of the present invention has overcome this deficiency of the art by utilizing an organic-functional silane adduct, preferably synthesized by the reaction of an amino-functional silane with an isocyanato-functional silane. While not wishing to be bound by any theory, it is believed that this adduct provides superior wet adhesion for a number of reasons. First, this adduct has a higher molecular weight than that of the individual silane and that of silanes known in the art. The higher molecular weight of the silane adduct is believed to reduce the evaporation rate during the cure of the coating in hot air. Thus, this silane adduct is more effectively involved in the metal and coating adhesion. Secondly, this silane adduct becomes a more effective crosslinker by doubling the methoxy or ethoxy groups of the individual silanes through the reaction. Thus, this silane adduct should have higher crosslinking density at the primer to substrate interface under water attack.

Amino-functional silanes useful in the present invention may be any amino-functional silane capable of reacting with an isocyanato-functional silane. In one embodiment, the amino-functional silane is an aminoalkyl silane. In another embodiment, the amino-functional silane is a secondary amino-functional silane. In a preferred embodiment, the amino-functional silane is a phenyl-substituted amino-functional silane. Examples of amino-functional silanes which are useful in the present invention include those available under the tradename Silquest™. Examples of useful Silques™ amino-functional silanes include Silquest™ Y-9669, N-phenyl-gamma-aminopropyltrimethoxysilane, Silquest™ A1170, bis-(gamma-trimethoxysilylpropyl) amine, Silquest™ A1100, gamma-aminopropyltriethoxysilane, Silquestm™ A1110, gamma-aminopropyltrimethoxysilane, and Silquest™ A1120, N-(beta-aminoethyl) -gamma-aminopropyltrimethoxysilane. The preferred amino-functional silane for use in the present invention is Silquest™ Y-9669.

The isocyanato-functional silane used in the primer composition of the present invention may be any isocyanato-functional silane which can react with an amino-functional silane. Generally, the isocyanato-functional silane has at least one isocyanate group. In a preferred embodiment, the isocyanato-functional silane is an isocyanatoalkylalkoxysilane, wherein the alkyl and alkoxy groups have 1–5 carbon atoms. An example of an isocyanato-functional silane useful in the present invention is Silquest™ A-1310, which is gamma-isocyanatopropyltriethoxysilane.

The relative proportion of organofunctional silane to isocyanato-functional silane present in the composition of the invention may vary somewhat depending on the use intended. Generally, the relative proportion of amino-functional silane to isocyanato-functional silane will be about 1:0.2 to about 1:1. In a preferred embodiment, the relative proportion of amino-functional silane to isocyanato-functional silane will be about 1:0.5 to about 1:0.8.

The organic-functional silane adduct generally will be present in the primer composition in an amount of about 0.2% to about 15% based on the dry weight of the total composition. Preferably, the silane adduct will be present in the primer composition in an amount of about 0.5% to about 5% based on the dry weight of the total composition. In a preferred embodiment, an excess of amino-functional silane will be present in the primer composition. This excess amino-functional silane is provided to react with any remaining isocyanate from the previous reaction of amino-functional silane with isocyanato-functional silane.

The phenoxy resin used in the composition of the present invention is provided as a toughener. Any phenoxy resin may be used; however, in a preferred embodiment, the phenoxy resin is crosslinked by a phenolic resin. It has been found that the reaction product of phenoxy resin crosslinked by phenolic resin has satisfactory thermal stability and hydrophobicity, enhancing the wet adhesion of the primer to the substrate. When phenoxy resin and a phenolic resin are provided in the primer composition, heat provided during the curing process in the bonding of an elastomeric material to a substrate with the primer compositions enables the crosslinking of the phenoxy resin by the phenolic resin.

The phenoxy resin may be any commercially available phenoxy resin such as Paphen phenoxy resin. The phenoxy resin generally will be present in the primer composition in an amount of about 10% to about 80% based on the dry weight of the total composition. In a preferred embodiment, the phenoxy resin is present in an amount of about 20% to about 50% based on the dry weight of the total composition.

The phenolic resin useful in the primer composition may be any resole or thermoset phenolic resin. In a preferred embodiment, the phenolic resin generally will be an alkylated thermosetting phenolic resin. In the most preferred embodiment, the phenolic resin is a butylated thermosetting phenolic resin such as GPRI 7590. The phenolic resin generally will be present in the primer composition in an amount of about 5% to about 70% based on the dry weight of the total composition. In a preferred embodiment, the phenolic resin is present in an amount of about 15% to about 45% based on the dry weight of the total composition.

The primer composition of the present invention also preferably contains a filler component, such as carbon black, metal oxides, organic fillers or talc. In a preferred embodiment, the filler component is talc. Any talc may be used, but the preferred talc is a surface treated talc, such as Mistron ZSC, which is surface treated with zinc stearate to obtain a hydrophobic surface. Due to the flake shape, talc is believed to have much better barrier properties than non-flake type fillers. Moreover, the surface treated talc has been found to have much higher hydrophobicity than untreated talc products. It is further believed that the high hydrophobicity of the treated talc reduces the water absorption rate which, in return, slows down the hydrolysis process of the crosslinked silanes of the present invention. The talc generally will be used in an amount of about 5% to about 60% by dry weight of the total composition. In a preferred embodiment, the talc will be used in an amount of about 20% to about 40% by dry weight of the total composition.

The primer compositions of the present invention can optionally contain well-known additives including plasticizers, pigments, reinforcing agents, and the like, in amounts employed by those skilled in the primer or adhesive arts to obtain the desired color and consistency. Typical optional additives include titanium dioxide, carbon black, and zinc oxide.

The dry components of the primer composition of the present invention generally will be mixed with one or more compatible solvents. These solvents may be organic solvents such as ketones, acetates, hydrocarbons, or alkyl alcohols. In one embodiment, the solvent component is a mixture of organic solvents. Preferred solvents include toluene, ethyl acetate or isopropyl alcohol. The solvent component generally will be used in an amount of about 20% to about 90% by wet weight of the total composition. In a preferred embodiment, the solvent will be used in an amount of about 60% to about 80% by wet weight of the total composition.

The primer compositions of the present invention are typically prepared by mixing the organic-functional silane with the phenoxy resin, the phenolic resin and any remaining ingredients. In a preferred embodiment, the composition is prepared by first reacting an amino-functional silane with an isocyanato-functional silane at room temperature by slowly adding the isocyanato-functional silane into the amino-functional silane under agitation. The remaining ingredients are then added to the silane adduct with mixing and agitation of the combination of ingredients in any conventional manner.

The materials which may be bonded to a substrate such as metal, ceramic, fiberglass, or organic polymers, with the primer compositions of the present invention, are preferably polymeric materials, including any elastomeric material selected from any of the natural rubbers and olefinic synthetic rubbers including polychloroprene, polybutadiene, neoprene, styrene-butadiene rubber, butyl rubber, brominated butyl rubber, nitrile butadiene rubber, fluoroelastomers, and the like. In a preferred embodiment, the primer composition is used for bonding nitrile butadiene rubber or a fluoroelastomer.

The substrate to which the elastomer is bonded with the primer composition of the invention can be any solid surface such as metal, ceramic, fiberglass, organic polymer or fabric capable of receiving the primer. Preferably, the primer composition will be used with a metal surface selected from any of the common structural metals such as iron, steel, including stainless steel, lead, aluminum, copper, brass, bronze, titanium, Monel metal; nickel, zinc, phosphatized steel, and the like.

The primer composition of the present invention may be used for a number of different applications, including as a primer, an adhesive, or a protective coating. For example, the primer compositions of the invention may be used as a surface protection coating for stainless steel and other metallic surfaces. Due to the good flexibility and coolant resistance of the primer composition, the primer composition may also be used as a general flexible, ethylene glycol resistant primer for rubber to metal bonding. In a most preferred embodiment, the primer composition of the invention is used for bonding nitrile butadiene rubber and/or a fluoroelastomer to stainless steel and the nitrile butadiene rubber and/or fluoroelastomer coated stainless steel is used to make multi-layer steel engine head gaskets. Such gaskets require aggressive environmental resistance to elements such as hot oil, hot coolant and heat aging. The primer composition of the invention provides all the performance needed for such applications.

The primer compositions are preferably used to bond an elastomeric material such as nitrile butadiene rubber or a fluoroelastomer to a metal surface. The primer composition may be applied to the metal surface by roll coating, spraying, dipping, brushing, wiping, screen printing, or the like, after which the adhesive is permitted to dry. The drying step may be by air drying or other method known to those of skill in the art. Generally, the air drying step will be conducted at temperatures less than about 300° F.

After the primer has been subjected to drying, an elastomer is applied to the primer surface by any of the methods known in the art. The elastomer is allowed to dry, also generally by air drying at temperatures less than about 300°

F. The elastomer/substrate composite which has been adhered with the primer composition may be then cured with heat. The time and temperature of the cure will depend upon the application for which the elastomer to substrate composite is intended. For example, for some applications, a fast cure is desirable. In those cases, a high temperature between about 400° F. and about 550° F. is used for less than about two minutes. For applications where a longer cure is acceptable, the temperature generally will be about 300° F. to about 350° F. for about two to about 10 minutes. After the process is complete, the bond is fully vulcanized and ready for use in a final application.

The following examples are given to illustrate the invention and should not be construed to limit the scope of the invention.

EXAMPLE 1

A primer composition according to the present invention was made by first preparing a silane adduct by reacting Silquest A1310, an isocyanato-functional silane, with Silquest Y9669, an amino-functional silane. Silquest A1310 is gamma-isocyanatopropyltriethyoxysilane and Silquest Y9669 is N-phenyl-gamma-aminopropyltrimethoxysilane. The reaction of the isocyanato-functional silane with the amino-functional silane was conducted at room temperature by slowly adding A1310 into Y9669 under agitation. No by-product was formed in this reaction.

After the silane adduct was formed, the remaining ingredients were combined with the silane adduct. The composition was as follows:

| Materials | Dry Weight (g) | Wet Weight (in g based on a total of 100 g) |
|---|---|---|
| Carbon black (N762) | 0.41 | 0.41 |
| talc (Mistron ZSC) | 15.69 | 15.69 |
| ZnO | 1.03 | 1.03 |
| Phenoxy resin | 9.71 | 9.71 |
| Phenolic resin (GPRI7590) | 10.94 | 18.24 |
| Silane adduct | 0.90 | 0.90 |
| Amino-functional silane (Silquest Y9669) | 0.33 | 0.33 |
| Toluene | — | 24.16 |
| ethyl acetate | — | 24.16 |
| Isopropyl alcohol | — | 5.37 |

This composition was draw-down coated on stainless steel coils. After the primer film was air dried at room temperature, a nitrile butadiene rubber coating was applied. After flashing off the solvents, a high temperature cure was conducted at 450° F. for 2 minutes.

The coated steel was then tested under different environments such as heat aging at 250° F., ASTM #3 oil immersion at 300° F. and coolant immersion at 212° F. for a specified time, such as 500 hours. The performance of the coating and primer was then evaluated by Scotch tape peel after cross-hatch. The results were that a 0% peel off of the coating was achieved.

EXAMPLE 2

A primer composition according to the present invention was made by first preparing a silane adduct by reacting Silquest A1310, an isocyanato-functional silane, with Silquest Y9669, an amino-functional silane, as in Example 1. The reaction of the isocyanato-functional silane with the amino-functional silane was conducted at room temperature by slowly adding A1310 into Y9669 under agitation. No by-product was formed in this reaction.

After the silane adduct was formed, the remaining ingredients were combined with the silane adduct. The composition was as follows:

| Materials | Dry Weight (g) | Wet Weight (in g based on a total of 100 g) |
|---|---|---|
| Carbon black (N762) | 0.41 | 0.41 |
| talc (Mistron ZSC) | 15.69 | 15.69 |
| ZnO | 1.03 | 1.03 |
| Phenoxy resin | 9.71 | 9.71 |
| Phenolic resin (GPRI7590) | 10.94 | 18.24 |
| Silane adduct | 0.90 | 0.90 |
| Amino-functional silane (Silquest Y9669) | 0.33 | 0.33 |
| Toluene | — | 24.16 |
| ethyl acetate | — | 24.16 |
| Isopropyl alcohol | — | 5.37 |

This composition was draw-down coated on stainless steel coils. After the primer film was air dried at room temperature, a fluoroelastomer coating was applied. The coated steel was then tested under different environments such as heat aging at 392° F., ASTM #3 oil immersion at 300° F. and coolant immersion at 212° F. for a specified time, such as 500 hours. The performance of the coating and primer was then evaluated by Scotch tape peel after cross-hatch. The result was that a 0% peel off of the coating was achieved.

While the invention has been described in detail and with reference to specific embodiments thereof, it will be apparent to one skilled in the art that various changes and modifications can be made without departing from the spirit and scope thereof.

I claim:

1. A primer composition, comprising: a phenolic resin, a phenoxy resin, and an organic-functional silane adduct which is the reaction product of (1) an isocyanatesilane and a non-isocyanatesilane which is reactive with isocyanate groups, or (2) reaction product of a molar excess of a non-isocyanate organofunctional silane with a polyisocyanate, wherein adduct (2) is characterized by the absence of free isocyanate groups.

2. The composition according to claim 1, wherein the phenoxy resin is crosslinked with the phenolic resin.

3. The composition according to claim 1, further comprising talc.

4. The composition of claim 3, wherein the talc is surface-treated.

5. The composition of claim 1, wherein the organic-functional silane adduct is prepared by reacting at least one hydroxy-, or mercapto-functional silane with at least one isocyanato-functional silane.

6. The composition of claim 5, wherein the isocyanato-functional silane is an isocyanatoalkylalkoxysilane wherein the alkyl and alkoxy groups, individually, have 1–5 carbon atoms.

7. The composition of claim 5, wherein the relative proportion of hydroxy-, or mercapto-functional silane to isocyanato-functional silane is between about 1.0:0.2 and about 1.0:1.0.

8. The composition of claim 7, further comprising surface-treated talc.

9. The composition of claim 8, further comprising an organic solvent.

10. A method of bonding an elastomer to a metal, comprising the steps of: coating the metal with a primer composition comprising a phenolic resin, a phenoxy resin, and an organic-functional silane adduct as claimed in claim 1, drying the primer composition coating, applying an elastomer coating to the primer composition, and curing the elastomer coating with heat.

11. The method of claim 10, wherein the organic-functional silane adduct is prepared by reacting at least one hydroxy-, or mercapto-functional silane with at least one isocyanato-functional silane or polyisocyanate wherein a molar excess of hydroxy-, or mercapto-functional silane is used, in relation to molar equivalents of isocyanate groups.

12. The method of claim 11, wherein the primer composition further comprises surface-treated talc.

13. The method of claim 12, further comprising drying the elastomer coating prior to curing.

14. The method of claim 12, wherein the metal is steel or stainless steel.

15. The method of claim 14, wherein the elastomer is nitrile butadiene rubber or a fluoroelastomer.

16. The method of claim 15, wherein the phenoxy resin is crosslinked by the phenolic resin during the curing step.

17. A thermally stable primer composition, comprising: a phenolic resin, a phenoxy resin, surface-treated talc and a silane adduct prepared by reacting an organofunctional silane selected from the group consisting of hydroxyfunctional silane and mercaptofunctional silane with an isocyanato-functional silane or polyisocyanate.

18. The primer composition of claim 17, wherein the phenolic resin is an alkylated thermosetting phenolic resin.

19. The primer composition of claim 17, wherein said primer is prepared with a molar excess of said isocyanato-functional silane or polyisocyanate relative to said organofunctional silane.

20. The primer composition according to claim 17, further comprising carbon black, metal oxide, or an organic filler.

* * * * *